Oct. 27, 1953        G. H. DANIELS        2,656,962
RECEPTACLE FILLING MACHINE

Filed Oct. 8, 1949        8 Sheets-Sheet 1

INVENTOR.
George H. Daniels
BY
ATTORNEY

INVENTOR.
George H. Daniels
BY
J. P. Moran
ATTORNEY

Oct. 27, 1953 G. H. DANIELS 2,656,962
RECEPTACLE FILLING MACHINE
Filed Oct. 8, 1949 8 Sheets-Sheet 3
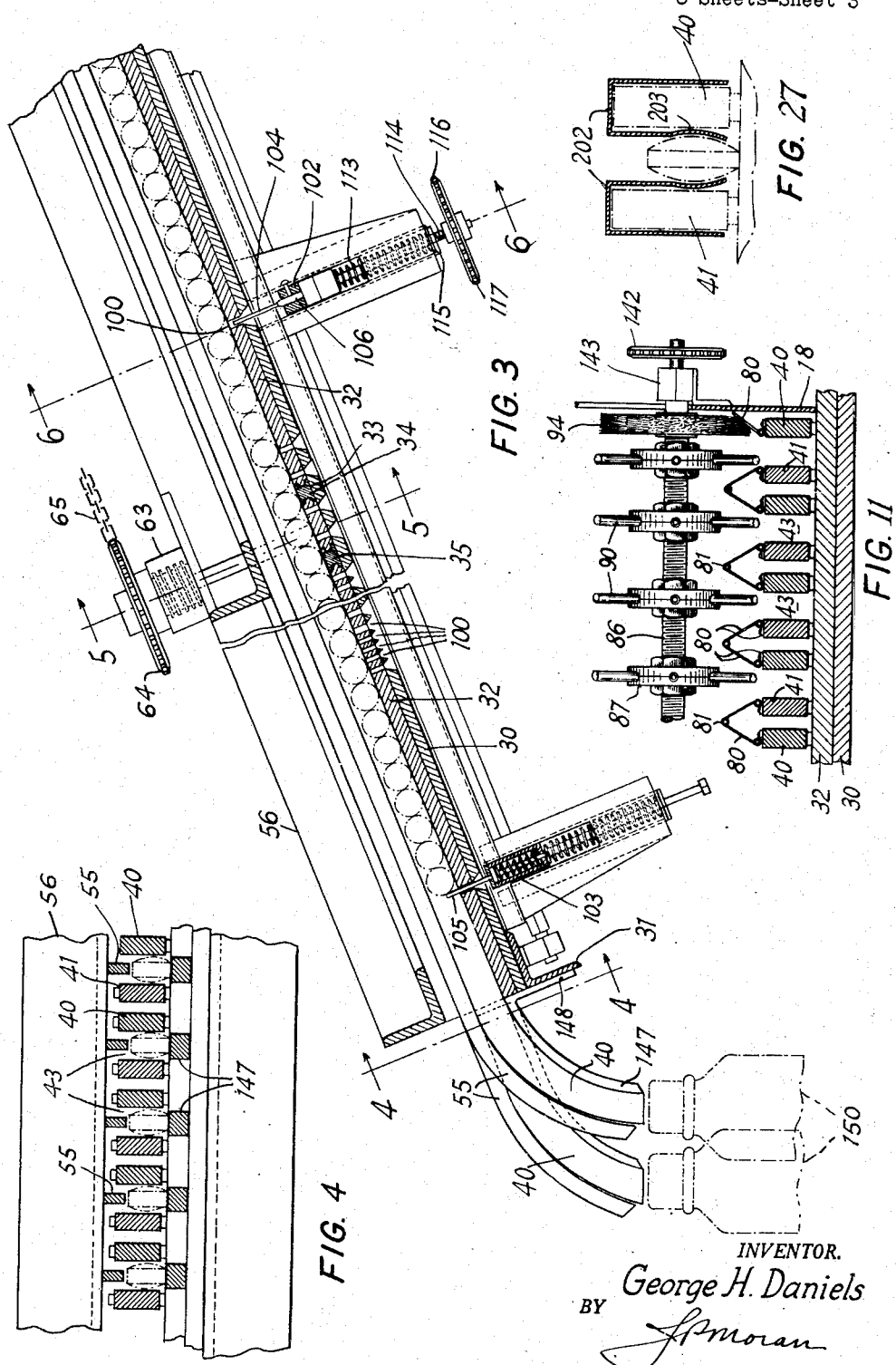
INVENTOR.
George H. Daniels
BY
J. P. Moran
ATTORNEY Oct. 27, 1953

G. H. DANIELS 2,656,962

RECEPTACLE FILLING MACHINE

Filed Oct. 8, 1949

INVENTOR.
George H. Daniels
BY
*JPMoran*
ATTORNEY

Oct. 27, 1953    G. H. DANIELS    2,656,962
RECEPTACLE FILLING MACHINE
Filed Oct. 8, 1949    8 Sheets-Sheet 6

INVENTOR.
George H. Daniels
BY
J. A. Moran
ATTORNEY

Oct. 27, 1953

G. H. DANIELS 2,656,962

RECEPTACLE FILLING MACHINE

Filed Oct. 8, 1949

INVENTOR.
George H. Daniels
BY
JP Moran
ATTORNEY

Oct. 27, 1953

G. H. DANIELS 2,656,962

RECEPTACLE FILLING MACHINE

Filed Oct. 8, 1949

INVENTOR.
George H. Daniels
BY
ATTORNEY

Patented Oct. 27, 1953

2,656,962

UNITED STATES PATENT OFFICE 2,656,962

RECEPTACLE FILLING MACHINE

George H. Daniels, Westfield, N. J.

Application October 8, 1949, Serial No. 120,371

28 Claims. (Cl. 226—2)

The present invention relates in general to improvements in the construction and operation of machines for discharging a predetermined number of articles into one or more suitable receptacles, and more particularly, to receptacle filling machines of the type disclosed in my prior application Serial No. 647,883, filed Feb. 15, 1946, now Patent No. 2,617,517, of November 11, 1952, in which predetermined numbers of freely movable articles, such as articles shaped as balls, rollers, discs and the like, are automatically and periodically discharged into a series of receptacles.

In article handling machines of the character described, a series of inclined side-by-side raceways are formed on a floor inclined at an angle greater than the angle of repose of the articles to be handled. A feeding mechanism is arranged to supply a row of articles to each of the raceways and a predetermined number of articles is periodically segregated and discharged from all of the raceways simultaneously by alternately operating stop devices spaced longitudinally of the raceways. The stop operating mechanism is advantageously adjustable to vary the number of articles periodically segregated in each raceway. The raceways are simultaneously adjustable in width and also in height to accommodate articles of a predetermined range of sizes.

In accordance with the present invention the construction of the machine is simplified and reduced in cost, the operation made more efficient, and the operating range increased, by an improved construction of the raceways and raceway mechanism, a more effective arrangement for positioning the articles fed to the raceways, an easy and accurate adjustment of the machine for a wide range of receptacle sizes, and a variable automatic control of the number of operating cycles. More specifically, the raceways are defined by one-piece side bars extending the full length thereof and made simultaneously adjustable throughout their lengths to vary the width of the raceways to extremely accurate dimensions. The height of all the raceways is also simultaneously adjustable to an accurate dimension within a predetermined range. A special article aligning construction is provided for the entrance section of the raceways which cooperates with a special rotary kickback throughout the range of raceway width adjustment. The raceways are arranged for single and multiple discharge into a series of receptacles with regulation of the articles discharged from the raceways of each group to avoid clogging in the associated funnel. The machine is made readily adjustable to fit receptacles of a wide range of heights. Accurate and automatic control of the cyclic operation of the article discharge mechanism is provided over the normal range of receptacle capacities.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 3 is an enlarged sectional elevation through a portion of one of the raceways;

Figure 6:
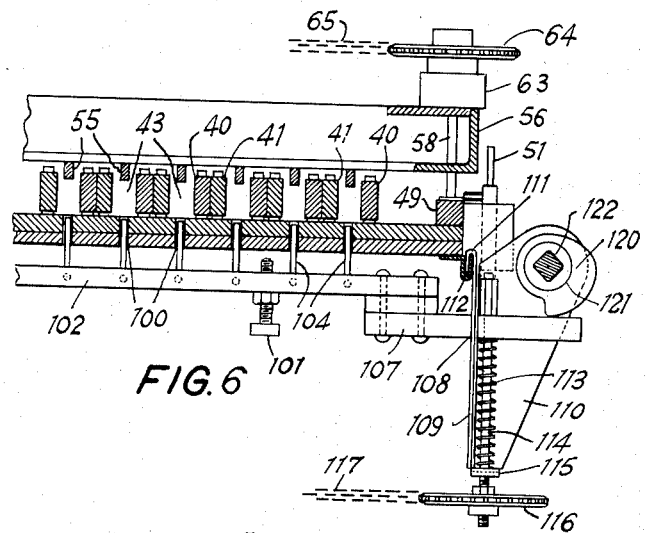
Figure 5:
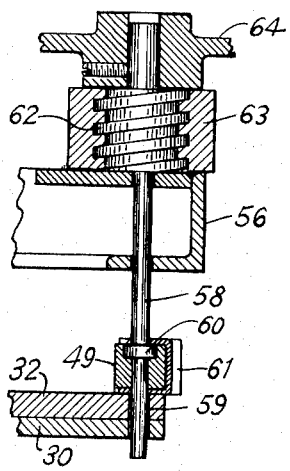
Figure 7:
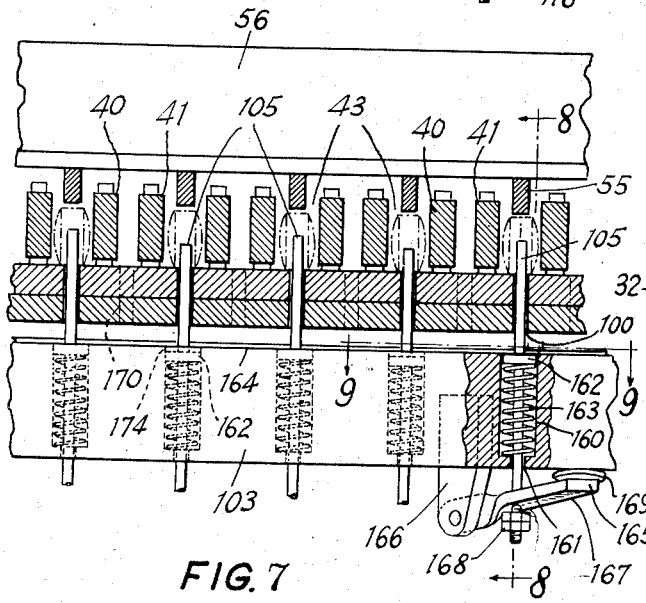
Figure 8:
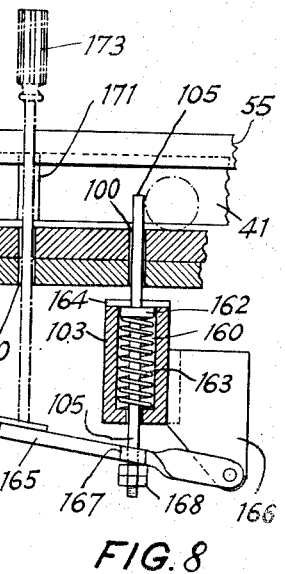
Figure 9:
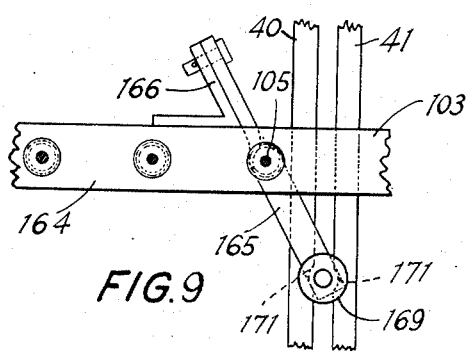
Figure 10:
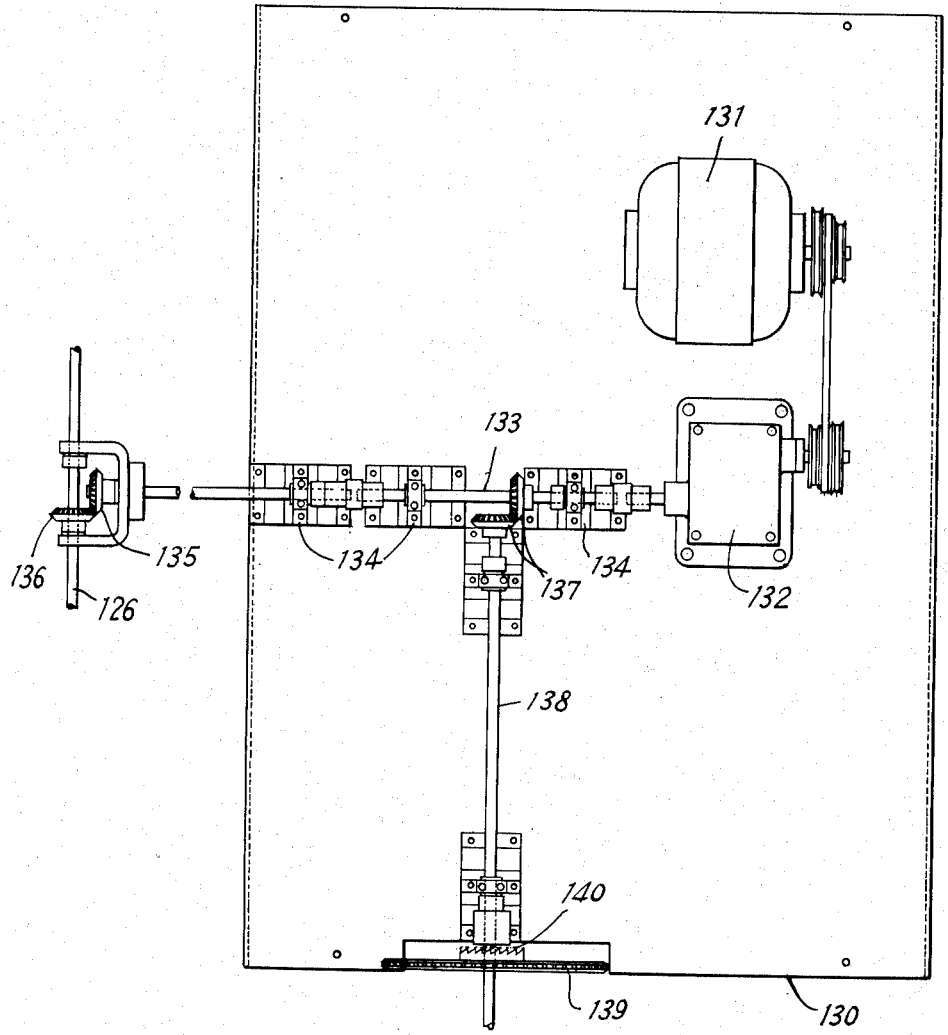
Figure 26:
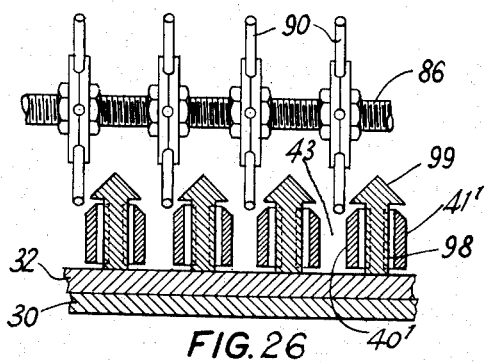
Figure 12:
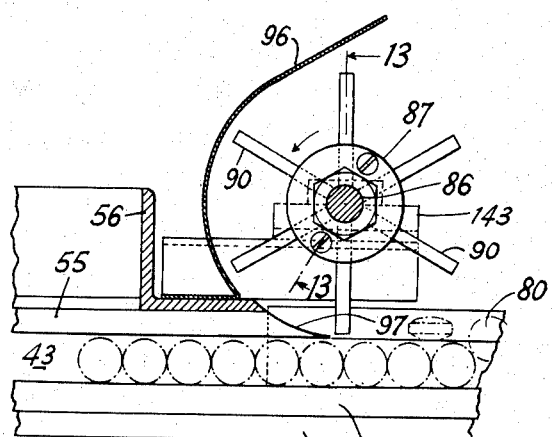
Figure 13:
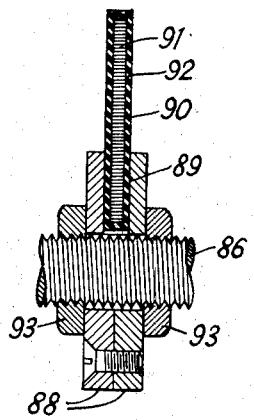
Figures 14, 15:
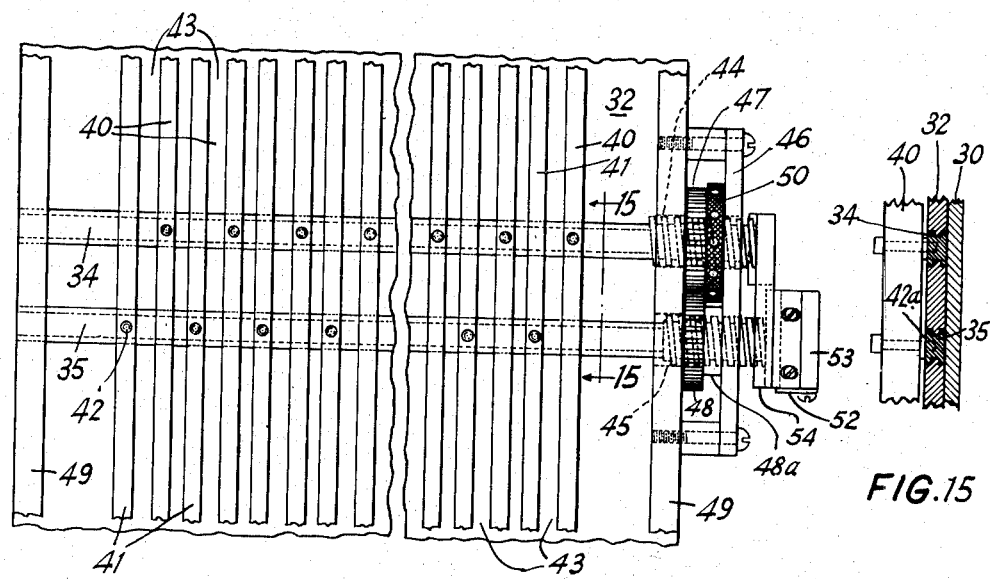
Figure 17:
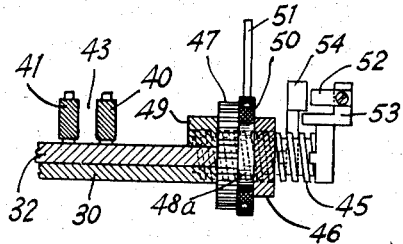
Figure 16:
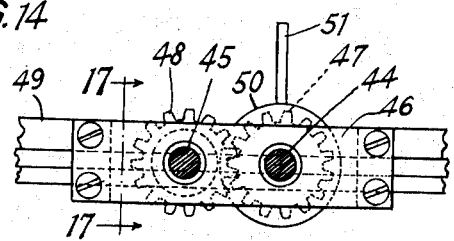
Figure 20:
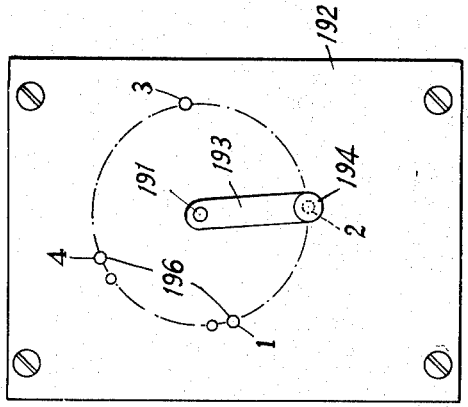
Figure 25:
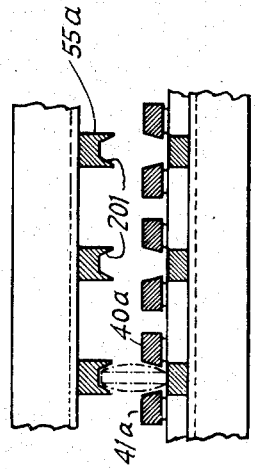
Figure 19:
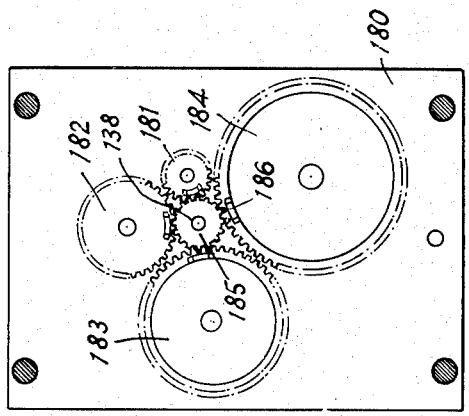
Figure 21:
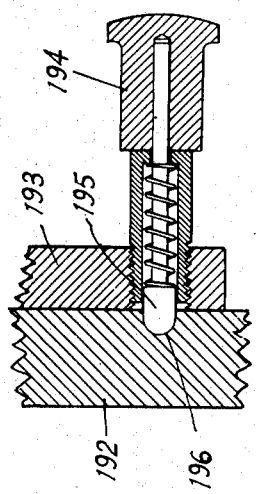
Figure 18:
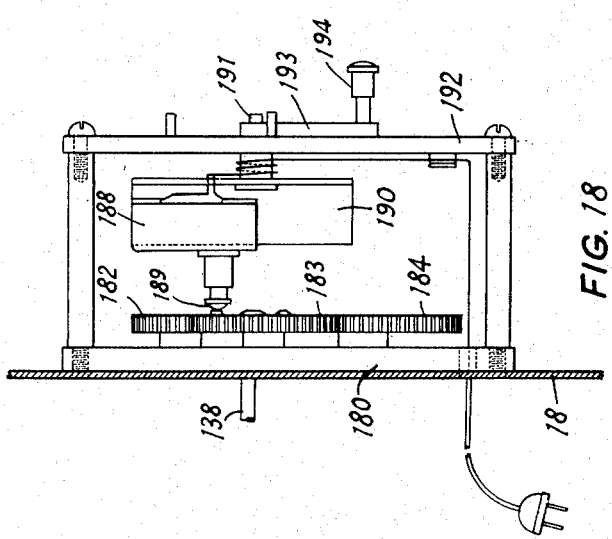
Figure 24:
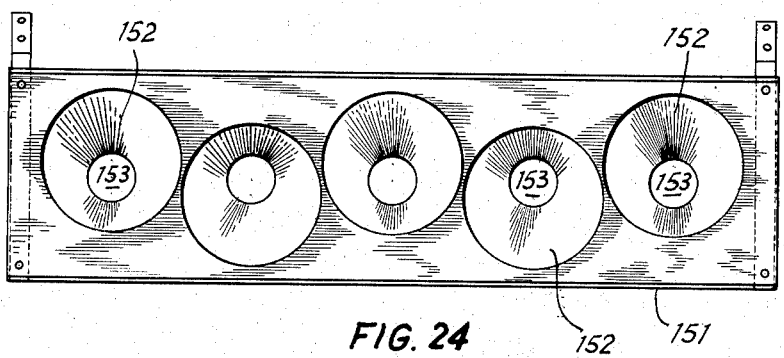
Figure 22:
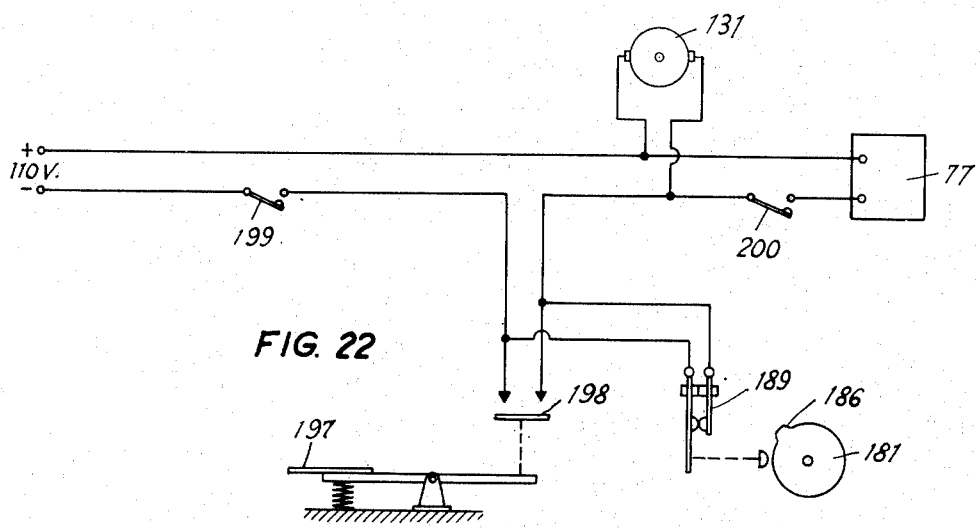
Figure 23:
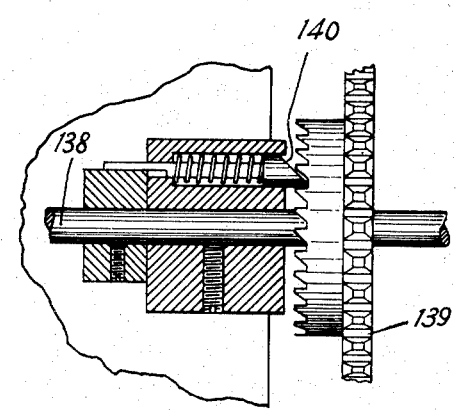

Figs. 4, 5, and 6 are vertical sections taken on the lines 4—4, 5—5, and 6—6 respectively of Fig. 3;

Fig. 7 is a transverse section, partly broken away, of a portion of the stop pin release mechanism;

Fig. 8 is a vertical section taken on the line 8—8 of Fig. 7;

Fig. 9 is a horizontal section taken on the line 9—9 of Fig. 7;

Fig. 10 is a plan view of the drive mechanism;

Fig. 11 is a rear view of the kickback mechanism;

Fig. 12 is a sectional elevation of the kickback mechanism;

Fig. 13 is a vertical section taken on the line 13—13 of Fig. 12;

Fig. 14 is a plan view of the raceway width adjusting mechanism;

Fig. 15 is a vertical section taken on the line 15—15 of Fig. 14;

Fig. 16 is a side elevation of the raceway width adjusting mechanism;

Fig. 17 is a transverse vertical section taken on the line 17—17 of Fig. 16;

Fig. 18 is a sectional elevation of the control mechanism;

Fig. 19 is an elevation of the control mechanism gearing;

Fig. 20 is an elevation of the control box;

Fig. 21 is a section of the control handle;

Fig. 22 is a wiring diagram of the machine;

Fig. 23 is an enlarged view of part of the drive mechanism;

Fig. 24 is a plan view of the funnel member;

Fig. 25 is a transverse vertical section, similar to Fig. 4, of a modified raceway construction; and Figs. 26 and 27 are modified raceway constructions.

The tablet bottle filling machine illustrated has a lower stationary housing section 10 of rectangular horizontal cross-section formed by suitable vertical corner angle members 11 connected by horizontal channel bars 12 at their upper and lower ends and closed in by side and end metal panels 13. A horizontal bottle-supporting shelf 14 is mounted on the front end of the lower housing section by brackets 15 detachably connected thereto below the top level thereof. The lower housing section serves as the base for an upper vertically adjustable housing section 16 of rectangular horizontal cross-section formed by suitable vertical and horizontal frame members 17 arranged to extend forwardly over the shelf 14. The upper housing section is approximately a right triangle in vertical cross-section with its opposite sides covered by substantially triangular metal panels 18 and rear end closed by an access door 19.

Vertical adjustment of the upper housing section 16 is effected by four pairs of oppositely arranged stationary nuts 20 secured on vertically aligned horizontal frame members 21 of the two sections in a rectangular formation. A vertical elevating screw 22 having oppositely threaded sections is mounted in each pair of nuts 20 with a sprocket 23 secured thereon intermediate the threaded sections. The sprockets 23 are connected by an endless chain 24 to provide simultaneous uniform rotation of the four elevating screws. One of the rear screws has a squared upper end to permit its turning with a ratchet wrench 25. Side and end apron plates 26 depend from the upper housing section and closely overlap the lower housing section 10 to maintain the housing closed throughout the range of elevating adjustment of the upper section. The described adjustment adapts the machine for a relatively wide range of bottle heights on the shelf 14.

The top of the machine is sloped substantially throughout its length at a predetermined angle dependent upon the angle of repose and desired rate of discharge of the articles to be handled. In the tablet machine illustrated a stationary base plate 30, inclined at an angle of about 25° to the horizontal, is mounted on an inclined supporting frame 31 of the upper housing section 16. Floor plate sections 32 are secured to the base plate in longitudinally spaced relation to form longitudinally spaced pairs of parallel transverse slots 33 therebetween in which pairs of adjusting bars 34 and 35 are slideably movable transversely of the base plate. As shown in Figs. 14 and 15, the floor plate sections 32 have tongued transverse edges fitting into corresponding grooves in the bars 34 and 35 to hold the bars in position in the same plane as the floor plate sections.

The adjusting bars 34 and 35 are connected to corresponding alternate longitudinally extending parallel raceway side bars 40 and 41 respectively by screws 42, the side bars having a clearance from the floor plate sections by means of washers 42ª on the screws between the connected bars. Each pair of bars 40 and 41 cooperates with the floor plate sections to form a tablet raceway 43 therebetween and being movable towards and away from each other to vary the width of the corresponding raceway 43, e. g. ⅛"–⅝". The raceway width is preferably one in which the tablets to be run will have a predetermined side clearance, thus permitting the tablets to roll freely down the raceways and yet preventing adjoining tablets from overlapping and jamming the raceways. The machine is preferably constructed with raceways in multiples of five, only twenty-four being shown.

A simultaneous uniform adjustment of each pair of bars 40, 41 in opposite directions is effected, as shown in Figs. 14, 16 and 17, by forming a threaded section 44, 45 at one end of each bar 34, 35 respectively. The threaded sections extend through openings in a stationary side bar 46 extending along the housing. Movement of the bars in opposite directions is effected by a pair of internally threaded meshing gears 47, 48 mounted on the threaded sections 44, 45 respectively between the side bar 46 and a bar 49 secured on and extending along the side of the floor plates, so that on rotation of the gears 47, 48, the restriction from lateral movement thereof causes a corresponding sliding movement of the bars 34, 35. A knurled extension 50 of the gear 47 is radially drilled at arcuately spaced points to permit a pin 51 to be inserted for rotation of the gears. The gear 48 has a hub 48ª filling the space to the plate 46. The extent of movement of the adjusting bars is accurately determined by the setting of an adjustable raceway width gauge 53 carried on the threaded end of the bar 35 and arranged to have a tablet positioned thereon relative to an arm 54 carried on the threaded end of the bar 34 for determining the proper raceway width. A stop 52 holds the sample tablet in position. Each pair of raceway adjusting bars can thus be accurately adjusted simultaneously to secure the exact width of raceway desired.

As shown in Figs. 1, 2, 5 and 6, the effective height of the raceways 43 is defined by a series of parallel top bars 55 extending above the center lines of the corresponding raceways. The bars are carried by a vertically adjustable rectangular frame 56 removably mounted on the floor and base plates of the machine through vertical shafts 58 extending through openings 59 in the side bars 49 and plates 30, 32 at four symmetrically arranged points. Each opening 59 is enlarged at its upper end to receive a collar 60 fixed on the shaft 58, the parts being readily assembled and disassembled by a pivoted clip 61 on the bar 49 engaging the shaft. Each shaft 58 extends through aligned openings in the frame 56 and has a threaded enlargement 62 positioned in a stationary nut 63 welded to the frame 56. A sprocket wheel 64 is keyed on each shaft 58 above the nut 63, the sprocket wheels being connected for simultaneous rotation by an endless chain 65. A pointer 66 carried on a side run of the chain is positioned adjacent a scale 67. The scale is mounted on the frame 56 and calibrated to indicate the effective height of the raceways for different positions of the pointer. An extremely fine simultaneous adjustment of the effective height of all of the raceways substantially throughout their length is thus possible.

It is essential to commerically acceptable operation of the machine that all of the raceways in use receive a continuous supply of unbroken tablets. For this purpose, at the upper end of the raceways is arranged a tablet feeding and aligning section, the principal parts of which are a feed hopper, an electro-magnetic vibrator unit and a rotary kickback operatively cooperating with a special construction of the entrance end of the raceways. A transversely elongated feed hopper 70 is mounted on the upper end of the machine and divided by vertical division plates into a plurality of side-by-side sections, each in alignment with a group of raceways. The hopper sections receive a supply of tablets from any suitable source. The tablet supply hopper 70 is of downwardly tapering rectangular cross-section and pivotally mounted on a pair of supporting brackets 71 secured on the upper rear end of the upper housing section. The hopper is open at its top and bottom and has a projecting flange 72 on each side intermediate its height and hinged at its rear end to the supporting brackets. A bolt 73 on each bracket projects through a slot in each flange and a pair of nuts 74 on the bolt at opposite sides of the flange form an adjustable front support for the hopper. A rearwardly inclined shallow spring held vibrator pan 75 is positioned below and extends beyond the front side of the hopper to a point overhanging the upper ends of the raceways. The pan is spaced below the bottom of the hopper and the sides and rear end of the space therebetween closed by a flexible inwardly curving rubber strip carried on the hopper plates and resting on the vibrator pan, thus preventing any tablets in the hopper from being caught between the bottom edges of the hopper and vibrator pan. The forward lower edge of the hopper is provided with a depending strip 76 of flexible rubber spaced relative to the vibrator pan sufficiently to permit only a single layer of tablets on their sides to pass therebetween. The vibrator pan is mounted on a conventional vibrating unit 77 carried by the brackets 71 and is arranged for high frequency vibration in the plane of the bottom of the pan. The vibrator unit is controlled by an adjustable frequency controller 78 secured to the side of the housing.

Figure 2:
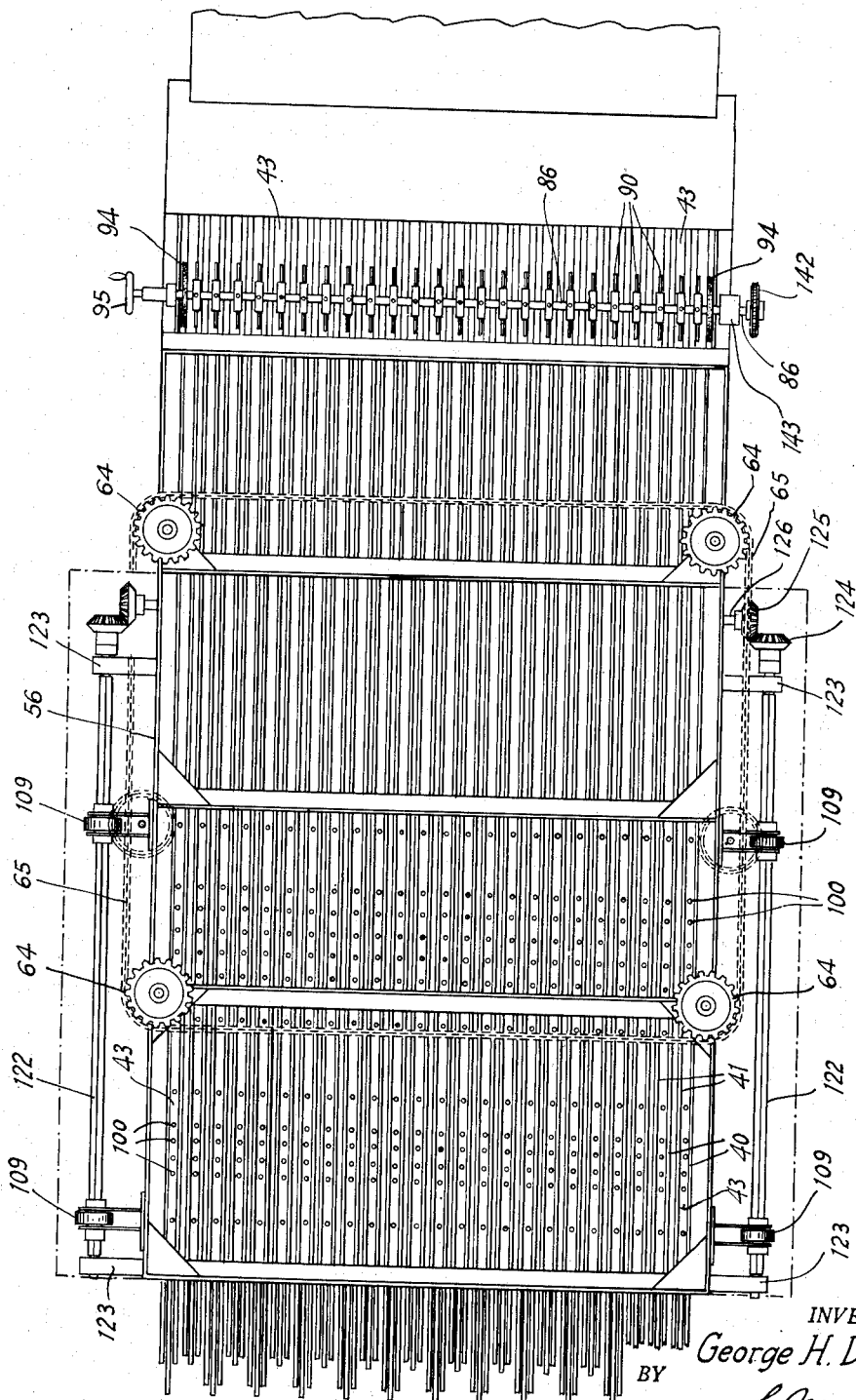
Fig. 2 is an enlarged partial plan view taken at right angles to the sloping machine top.

The vibrator pan 75 feeds a continuous layer of tablets from its forward end on to the entrance section of the raceways which, as shown in Figs. 2, 11 and 12, extends beyond the upper end of the frame 56 and top bars 55. It is necessary to turn the tablets from their horizontal position leaving the vibrator pan to a vertical or on edge position in the raceways and for this purpose the portions of the raceways in this section are surmounted by a downwardly converging extension formed by an inverted V-shaped formation of four hinged plates 80 connecting the raceway bar 40 of one pair to the bar 41 of the adjacent pair. Each peak formation is formed by a pair of oppositely inclined plates hingedly connected at their upper edges by a piano type hinge 81. The inclined plates 80 are similarly hinged to the horizontal plates 89 secured to the bars 40, 41. With this construction, the peak formations between the raceways will be retained throughout the range of width adjustment of the raceways, the apex angle varying between about 60° and 90°. The hinge pin of the apex hinge is made readily removable to facilitate assembly and disassembly of the parts. The outermost bars are provided with a half-peak formation with a single inclined plate 80 resting against the adjacent housing side plate 18, as shown in Fig. 11. The tablets passing onto the hinged sections of the bars will normally slide down the inclined plates 80 and assume an upright or on edge position in the raceways.

In operation, it has been found that tablets discharged from the vibrator pan frequently tend to ride over the tops of the tablets in the raceways, being carried along in a horizontal or cocked position by the movement of the subjacent tablets. A rotary kickback 85 having a special wear resistant construction of the tablet contacting parts is arranged across the entrance section of the raceways. The kickback consists of a horizontal threaded shaft 86 extending across the machine above the tablet raceways and carrying a series of kickback elements 87 thereon corresponding to the number of raceways. As shown in Figs. 11, 12 and 13, each kickback element consists of a pair of detachably connected washers 88 having a series of radial semi-circular grooves 89 formed in their contacting faces and cooperating to define angularly spaced radial passages into which fit reinforced rubber fingers 90. Each finger is formed by inserting a tempered coiled wire spring 91 into a tube 92 of unvulcanized rubber and radially compressing the rubber under heat to form a reinforced integral structure. The washers 88 are assembled with the fingers 90 in the radial passages and uniformly projecting beyond the washer periphery. The kickback elements so formed are held on the threaded shaft by pairs of nuts 93 at opposite sides thereof, permitting lateral adjustment of the kickback elements relative to the raceways. As shown in Fig. 11, the kickback elements are preferably arranged slightly off-center of the corresponding raceways, so that when the elements are rotated in their normal counterclockwise direction the fingers will exert successive turning movements on any tablets in or above the raceways in a horizontal or inclined position, thus preventing passage of the tablets below the kickback elements until the tablets are in the normal upright position in the raceways. At the outer sides of the outermost raceways are arranged circular brush elements 94 on the kickback shaft to prevent any tablets from being jammed against the side of plate 18 and broken. Such circular brushes however have been found unsuitable as kickback elements and the described angularly spaced reinforced resilient fingers of non-marking rubber have proved to be highly effective in preventing the passage of tablets out of normal position. A spring coupling drive connection, hereinafter described, to the shaft 86 permits the kickback shaft to be rotated by hand through a handle 95 on its opposite end to fill the raceways when the machine is to be put into service and before starting the drive motor.

As shown in Fig. 12, a curved shield 96 is mounted on the upper end of the frame 56 and arranged to extend from the lower rear quadrant of the kickback to a point adjacent the vertical centerline thereof to prevent any tablets passing beyond the kickback except when properly positioned in the raceways. It has also been found beneficial to extend the raceway top bars 55 to a point corresponding to the lowermost point of movement of the fingers 90, the upper surface of the bars being cut away along an arc corresponding to the peripheral arc of movement of the fingers, as shown at 97, to permit the kickback fingers to operate with a minimum clearance with the top of the tablets in the raceways.

A modified entrance section construction is shown in Fig. 26 in which the raceway side bars 40', 41' are cut away at their outer sides to permit the insertion therebetween of stationary bars 98 having overhanging peaked tops 99 which cooperate with correspondingly sloped top edge portions of the side bars to form inclined surfaces for the tablets.

The mechanism for periodically segregating a corresponding number of tablets in each raceway and discharging the batches or groups of segregated tablets substantially simultaneously from all of the raceways 43 is illustrated in Figs. 2–9. For this purpose, the base plate 30 and floor plate sections 32 have transverse rows or registering openings 100, each extending normal to the centerline of the corresponding raceway, the rows being longitudinally spaced to permit segregation of variable quantities of tablets of different diameters. The machine illustrated is adapted to segregate 5–50 tablets, ranging in diameter from ¼″ to 11/16″, in each raceway, for example. A pair of longitudinally spaced cross-bars 102 and 103 are provided below the base plate, the upper cross-bar 102 carrying a series of stop pins 104 and the lower cross-bar 103 carrying a series of stop pins 105. The pins 104 are adjustably held in holes 106 in the cross-bar 102. A pair of adjusting bolts 101 on each cross-bar permits regulation of the maximum extent of projection of the pins through the corresponding opening into the raceways. The cross-bar 103 is normally located below the lowermost row of stop pin openings and the cross-bar 102 below the row of openings which will permit a predetermined number of tablets to be positioned in the portion of each raceway between the two rows then occupied by the stop pins 104 and 105.

The cross-bars 102 and 103 are resiliently supported by horizontal extension arms 107 projecting through vertically elongated slots 108 in the inner side of pairs of traveling carriages 109 at opposite sides of the machine. A pair of vertical flanges 110 extend outwardly on each carriage along the sides of the slot 108. The carriages are slideably mounted by inverted flanges 111 fitting into U-shaped rails 112 at opposite sides of the machine. Each cross-bar arm is resiliently supported on a spring 113 carried on a bolt 114, which is threaded through the arm and slideably extends through a bottom flange 115 on the carriage, the spring 113 abutting the bottom flange and underside of the extension arm. When the cross-bar 102 is to be moved to a new row of stop pin openings, the operator depresses the pair of extension arms 107 against the springs 113 until the stop pins are below the base plate 30. The stop pins 104 are withdrawn from the openings by rotation of sprocket wheels 116 threaded on the lower end of the bolts 114 and connected by an endless chain 117, to abut the flange 115. The upper pair of carriages 109 are then simultaneously slid along the rails 112 to the desired row of upper openings. The shafts 122 are graduated to indicate the proper carriage position for each row of openings.

The mechanism for vertically reciprocating the stop pins 104 and 105 in the corresponding sets of openings 100 consists of oppositely arranged pairs of cams 120, each cam having bearing portions 121 rotatably mounted in the flanges 110 of each carriage 109 at the outer sides of the bolts 114 and arranged to actuate the corresponding extension bar 107, the cam bearing portions 121 being formed with square openings through which an operating shaft 122 of square cross-section extends at each side of the machine, so that the carriages and cams are slideable on the shaft. The end portions of each shaft 122 are of circular cross-section for rotation in pillow blocks 123 on the base plate 30. The upper ends of the shafts carry miter gears 124 which are arranged to mesh with oppositely arranged miter gears 125 on a transverse shaft 126.

As shown in Figs. 1, 10, 22 and 23, the drive mechanism for the tablet segregating and discharge mechanism and the kickback are mounted on a shelf 130 in the rear portion of the upper housing section and consists of a fractional horsepower high speed electric motor 131 having a belt drive through a speed reducer 132 to a horizontally arranged sectional main drive shaft 133 carried in bearings 134 mounted on the shelf. The forward end of the shaft 133 carries a miter gear 135 engaging a miter gear 136 on the transverse shaft 126 to drive the stop pin operating shafts 122. The drive shaft 133 is also connected through miter gears 137 at a point intermediate its length to a transverse horizontal shaft 138 extending through one side of the housing. A sprocket wheel 139 is rotatably mounted on and operatively connected to the shaft 138 at the inner side of the housing through a spring pressed toothed coupling 140, as shown in Fig. 23. An endless chain 141 connects the sprocket wheel 139 to a small sprocket wheel 142 on the corresponding end of the kickback shaft 86. The shaft 86 is positioned in bearings 143 which are mounted on the frame 56 and vertically adjustable therewith so that the position of the kickback fingers 90 relative to the raceways will be uniform for different diameter tablets. A spring held idler sprocket 144 pivotally mounted on the inner side of the housing provides a uniform tension on the chain 141 throughout the range of vertical adjustment of the kickback shaft. With the described drive connection, the kickback shaft can be manually rotated by the handwheel 95 on starting up to allow the raceways to fill with tablets before the motor 131 is started to drive the stop pin operating mechanism.

With the described drive mechanism, the shafts 122 rotate in opposite directions and the transversely opposite cams 120 are oppositely arranged, providing a uniform reciprocating movement of the cross-bars 102, 103 throughout their length normal to the bottom of the raceways. The pair of cams 120 on each shaft are of similar shape and angularly spaced 180° thereon, so that when the stop pins 104 are in their lowermost or retracted position as in Fig. 6, i. e. flush with or slightly below the bottoms of the raceways, the stop pins 105 will be in their uppermost or raised position as in Fig. 7, i. e. about at the center line of the tablets, and vice versa. This degree of projection provides an effective stop for the tablets, yet avoids any tendency to rupture the same. The curved surfaces of the cams 120 are proportioned to effect a short dwell in the raised position, a gradual descending movement, a long dwell in the low position, and a rapid return of the stop pins to the raised position.

Figure 1:
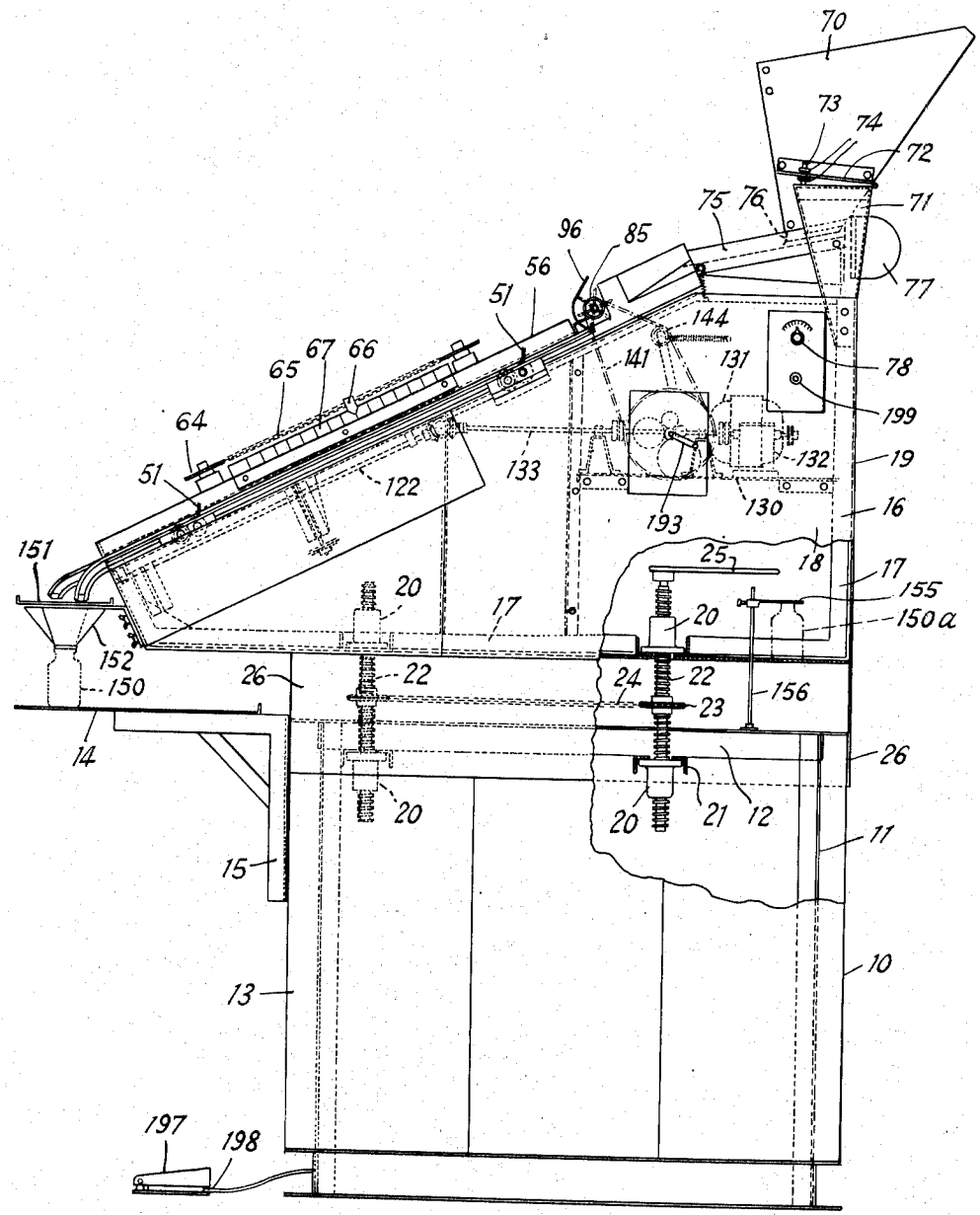
Fig. 1 is a side elevation partly broken away of a tablet bottle filling machine constructed in accordance with my invention.

As shown in Figs. 1–3, the discharge ends of the raceways 43 are constructed to permit an individual discharge of each raceway into a single receptacle, or a discharge of multiple raceways into a funnel discharging into a corresponding receptacle. The discharge ends of adjacent raceways are staggered, each being formed by downwardly curved continuations of the side bars 40, 41 and top bar 55. The bottoms of the raceway discharge sections are defined by separate curved plates 147 having a flange 148 secured to the frame 31. As shown in Fig. 3, the lower ends of all of the raceways terminate at the same level immediately above the mouths of bottles 150 in a correspondingly staggered arrangement on the shelf 14. When large capacity receptacles are to be filled, a multiple funnel member 151 is detachably connected to the front end of the upper housing section 16. The funnel member has a staggered formation of wide mouthed funnels 152, each having an off-center discharge opening 153 therein so that the discharge openings of all the funnels will be in transverse alignment.

The elevation of the upper housing section 16 relative to the shelf 14 is set by the elevating screws 22 for the proper location of the raceway ends or funnel openings 153 relative to the receptacles 150. To facilitate this adjustment when the funnel is used, a stop member 155 is positioned on a staff 156 mounted on the lower housing section frame 12 and extending into the upper housing section. The staff is graduated for different size bottles and the stop 155 set at the desired elevation. A bottle 150a of the same size as those to be filled is positioned on the bottom of the upper housing section and the elevating screws 22 adjusted until the bottle 150a contacts with the stop 155.

The lower set of stop pins 105 have alternate pins of each group of five at different elevations above the raceway bottoms, as shown in Fig. 7. By having the second and fourth raceway pins slightly shorter than the remaining adjacent pins, it has been found that the segregated groups in the second and fourth raceways will discharge sufficiently in advance of the other groups into a common funnel 152 that a smooth uniform discharge of tablets will occur through the funnel discharge opening 153 avoiding any clogging of the tablets in the opening.

A special mounting of the pins 105 in the cross-bar 103 is used to permit individual depression of each pin 105 for the removal of a broken tablet in the corresponding raceway. As shown in Figs. 7-9, the cross-bar 103 has a recess 160 through an opening 161 in the bottom of which the stop pin 105 projects. The pin has a collar 162 and a surrounding coiled spring 163 in the recess abutting the collar and recess bottom. The top of the recess is closed by a plate 164 through which the pins project, so that when the bar 103 is depressed by the cams the pin will be correspondingly depressed. A spacing washer 174 is inserted on the pins between the collar 162 of the second and fourth raceways and plate 164 to decrease the elevation of the corresponding pins. A lever 165 pivoted on a stationary bracket 166 carried by the cross-bar 103 has an opening 167 therein through which the stop pin projects, with a locknut 168 on the lower threaded end of the stop pin against which the lever abuts when a washer 169 spot welded on its free end is depressed. The lever is angularly arranged relative to the cross-bar so that the center of the washer 169 is in vertical alignment with the center line of the space between the side bar 40 of the raceway and the side bar 41 of the next raceway. A hole 170 is drilled through the plates 30 and 32 in alignment with the washer 169 and the adjacent portions of the side bars cut away as shown at 171 to permit a tool 173 to be inserted by the operator to depress the lever 165 after the machine has been stopped. With this arrangement only the group of tablets including the broken tablet need be discharged to waste, thus facilitating the removal of the broken tablet with a minimum waste of time and tablets.

The machine illustrated is designed to handle tablets ranging in size from ¼-1⅛" in diameter and to discharge the same in batches of 5, 6, 15, 20, 25 or 50 tablets from each raceway, either into individual receptacles or in groups of five adjacent raceways into a common funnel and receptacle. Where the receptacles have an individual capacity of, for example, 500 tablets, the preferred arrangement would be to have groups of five raceways simultaneously discharge five batches of 25 tablets into a common funnel and receptacle and to operate the machine four cycles of operation of the raceway stop mechanism before stopping the machine to replace the then full receptacles with empties.

In accordance with the invention, an automatic control mechanism is provided by which the operator can set the machine to operate the drive mechanism for one to four cycles and automatically stop until manually started to repeat the operation. The control mechanism is mounted on the outer end of the transverse shaft 138 projecting through the housing side panel 18, as shown in Figs. 18-21, and comprises a plate 180 secured to the housing and carrying four gears 181, 182, 183, and 184 arranged to mesh with a gear 185 mounted on the projecting end of the shaft 138. I have discovered that if the gears 185 and 181 have a pitch diameter of .75" and 18 teeth of No. 24 pitch, the gear 182 with a pitch diameter of 1.5" and 36 teeth, the gear 183 with a pitch diameter of 2.25" and 54 teeth, and the gear 184 with a pitch diameter of 3" and 72 teeth, the gears 181, 182, 183 and 184 will simultaneously mesh with the gear 185 while maintaining sufficient clearance to permit their rotation, as shown in Fig. 19. Each of the gears 181-184 carries on its outer face a small contact bar 186 adjacent its periphery. Each bar has a center section of uniform thickness and inclined end portions. A microswitch mechanism 188 having a spring-pressed reciprocable switch member 189 is mounted on a rotatable bracket 190 carried by a shaft 191. The shaft 191 is rotatably mounted in a front plate 192 and moved by a lever 193 having a handle 194 adapted to be held in the positions indicated by the numerals 1, 2, 3 and 4 (Fig. 20) by a spring-pressed pin 195 fitting into recesses 196 in the plate 192 at the locations indicated by the numerals. When, for example, the handle is in position 1, the switch member 189 will be in position to ride on the contact bar 186 on the gear 181. The switch 189 is normally closed and on being pushed inwardly by riding up on the contact bar 186 opens to break the circuit of the motor 131 and end the operating cycle. When the handle is set in any of the other operating positions, the gear 185 will make a corresponding number of revolutions between successive actuations of the switch member 189 by the corresponding contact bar 186.

As diagrammatically indicated in Fig. 22, the motor and vibrator circuits are initially closed to start each operating cycle by the operator depressing a foot pedal 197 to close a normally open microswitch 198. The microswitch 198 is kept closed until the gears 181-184 in contact with the microswitch 189 are rotated sufficiently to move the switch 189 off the corresponding contact bar 186 allowing the switch 189 to return to its normally closed position until again contacted by the bar 186. A manual switch 199 controls the connection to the electrical power source and a manual switch 200 is arranged in the vibrator circuit.

In Fig. 27, I have shown a special raceway construction for running high crowned tablets. For this purpose inverted U-shaped jackets 202 having outwardly curved inner sides 203 are clipped on the raceway side bars 40, 41, the curvature of the portions 203 corresponding to the crown of the tablets.

As indicated in Fig. 4, when the tablets are in the raceway construction described, the side bars 40, 41 are of sufficient height so that the tablets are relatively invisible to the operator. When greater tablet visibility is desired, the machine is provided with the raceway construction illustrated in Fig. 25 in which the side bars 40ª, 41ª are much lower in height and formed with inclined inside surfaces. The top bar 55ª in this modified arrangement has a recessed bottom surface 201 of trapezoidal cross-section into which the tablets loosely fit. The side bars and top bar thus cooperate to form raceways open at their sides, permitting the inspection of the tablet rows and the removal of any broken tablets which may reach the raceways.

With the described construction, a single machine will have a handling capacity of 400,000–600,000 tablets per hour depending upon the size of the tablets handled. All of the raceway parts in contact with the tablets are of stainless steel or chromium plated construction, avoiding contamination of the tablets. A high capacity sanitary filling operation is thus affected.

While in accordance with the provisions of the statutes I have illustrated and described herein the best form of the invention now known to me, those skilled in the art will understand that changes may be made in the form of the apparatus disclosed without departing from the spirit of the invention covered by claims, and that certain features of the invention may sometimes be used to advantage without a corresponding use of other features. While the machine has been specifically described and is especially useful for handling articles of circular cross-section, it can also be used for other freely movable articles, such as capsules, which will slide down the raceways, for example.

This application is a continuation-in-part of my said prior application, Serial No. 647,883, filed February 15, 1946, now Patent No. 2,617,517, of Nov. 11, 1952.

I claim:

1. An article handling machine comprising an inclined floor, means arranged to form a series of inclined side-by-side raceways on said floor, means for supplying a row of articles to each of said raceways, upper and lower transverse rows of floor openings spaced longitudinally in said raceways, upper and lower transverse rows of stop pins arranged for reciprocation in said upper and lower rows of floor openings respectively, means for alternately raising and lowering said upper and lower rows of stop pins to periodically segregate and discharge a predetermined number of articles from all of said raceways substantially simultaneously, control means for automatically stopping said stop pin raising and lowering means after a variable number of complete operating cycles, and means for manually setting the number of operating cycles to be completed.

2. An article handling machine comprising an inclined floor, means arranged to form a series of inclined side-by-side raceways on said floor, means for supplying a row of articles to each of said raceways, upper and lower transverse rows of floor openings spaced longitudinally in said raceways, upper and lower transverse rows of stop pins arranged for reciprocation in said upper and lower rows of floor openings respectively, means for alternately raising and lowering said upper and lower rows of stop pins to periodically segregate and discharge a predetermined number of articles from all of said raceways substantially simultaneously, and motor control means for automatically stopping said stop pin raising and lowering means after one or more operating cycles comprising a gear arranged to complete one rotation for each operating cycle, a series of driven gears engaging and having predetermined whole number gear tooth ratios to said first named gear, a switch actuating member on each of said driven gears, and a switch member movable into the path of movement of each of said switch actuating members.

3. An article handling machine comprising an inclined floor, means arranged to form a series of inclined side-by-side raceways on said floor, upper and lower transverse rows of floor openings spaced longitudinally in said raceways, upper and lower transverse rows of stop pins arranged for reciprocation in said upper and lower rows of floor openings respectively, means for alternately raising and lowering said upper and lower rows of stop pins to periodically segregate and discharge a predetermined number of articles from all of said raceways substantially simultaneously, and means for separately depressing individual lower stop pins below said floor level.

4. An article handling machine comprising an inclined floor, means arranged to form a series of inclined side-by-side raceways on said floor, upper and lower transverse rows of floor openings spaced longitudinally in said raceways, upper and lower transverse rows of stop pins arranged for reciprocation in said upper and lower rows of floor openings respectively normal to the angle of inclination of said raceways between elevations above and below said floor, means for alternately raising and lowering said upper and lower rows of stop pins to periodically segregate and discharge a predetermined number of articles from all of said raceways substantially simultaneously, and adjusting screw means arranged to simultaneously withdraw all of said upper stop pins from said floor openings.

5. An article handling machine comprising an inclined floor, a series of parallel raceway-forming bars arranged along said floor to form inclined raceways therebetween for rows of movable articles, a frame carrying a series of parallel bars forming the tops of said raceways, frame elevating means at symmetrically spaced points on said floor, and means for simultaneously operating all of said frame elevating means.

6. An article handling machine comprising an inclined floor, a series of parallel raceway-forming bars arranged along said floor to form inclined raceways therebetween for rows of movable articles, a rectangular frame carrying a series of parallel bars forming the tops of said raceways, means for varying the elevation of said frame and top bars comprising shafts at symmetrically spaced points on said floor and having a threaded connection with said frame, and means for simultaneously rotating said shafts comprising a sprocket on each shaft, and an endless chain connecting said sprockets.

7. An article handling machine comprising an inclined floor, a series of parallel raceway-forming bars arranged along said floor to form inclined raceways therebetween for rows of movable articles, a rectangular frame carrying a series of parallel bars forming the tops of said raceways, means for varying the elevation of said frame and top bars comprising shafts at symmetrically spaced points on said floor and having a threaded connection with said frame, means for simultaneously rotating said shafts comprising a sprocket on each shaft, and an endless chain connecting said sprockets, and means for indicating the degree of chain movement for a predetermined elevation.

8. An article handling machine comprising an inclined floor, a series of parallel raceway-forming bars of relatively low height arranged in pairs along said floor to form inclined shallow raceways therebetween for rows of freely movable articles of circular cross-section, and a series of parallel bars forming the tops of said raceways and having shallow recessed undersides arranged to receive therein the edge portion of said articles, whereby a major portion of said articles is exposed in the space between said raceway-forming bars and said top bar.

9. An article handling machine comprising a lower housing section having a receptacle holding shelf at one end, an upper housing section having a series of inclined raceways fixed thereon for rows of freely movable articles and having fixed article discharge ends terminating above said shelf, and elevating means for adjusting the elevation of said entire upper housing section to vary the elevation of said raceway discharge ends relative to said shelf.

10. An article handling machine comprising a lower housing section having a receptacle holding shelf at one end, an upper housing section having a series of inclined raceways thereon for rows of freely movable articles and terminating above said shelf, a funnel member on said upper housing section arranged to receive the articles discharged from said raceways, elevating means for adjusting the elevation of said upper housing section relative to said shelf, and a receptacle height gauge mounted on said lower housing section and carrying an adjustable stop arranged to be contacted by a sample receptacle on said upper housing section when said upper housing section is at the desired elevation.

11. An article handling machine comprising means arranged to form a series of parallel inclined raceways for rows of freely movable articles, said raceways having alternate laterally staggered discharge ends, and a funnel member comprising a laterally staggered series of funnels, each arranged to receive the articles discharged from a plurality of said raceways, and a discharge opening in each of said funnels in alignment with the discharge openings of said remaining funnels.

12. An article handling machine comprising means arranged to form a series of parallel inclined raceways for rows of freely movable articles, said raceways having alternate laterally staggered discharge ends, a funnel member comprising a laterally staggered series of funnels, each arranged to receive the articles discharged from a group of said raceways, and means for initiating the discharge from adjacent raceways of each group at different times.

13. An article handling machine comprising an inclined floor, means arranged to form a series of inclined side-by-side raceways on said floor, means for supplying a row of articles to each of said raceways, upper and lower transverse rows of floor openings spaced longitudinally in said raceways, upper and lower transverse rows of stop pins arranged for reciprocation in said upper and lower rows of floor openings respectively between elevations above and below said floor, means for alternately raising and lowering said upper and lower rows of stop pins to periodically segregate and discharge a predetermined number of articles from all of said raceways substantially simultaneously, a funnel arranged to receive the discharge from a group of said raceways, and the lower stop pin for one raceway of said group being arranged to project above said floor level at a lesser elevation in its raised position than the lower stop pin of an adjacent raceway of said group.

14. An article handling machine comprising an inclined floor, means arranged to form a series of inclined side-by-side raceways on said floor, means for supplying a row of articles to each of said raceways, upper and lower transverse rows of floor openings spaced longitudinally in said raceways, upper and lower transverse rows of stop pins arranged for reciprocation in said upper and lower rows of floor openings respectively normal to the angle of inclination of said raceways between elevations above and below said floor, means for alternately raising and lowering said upper and lower rows of stop pins to periodically segregate and discharge a predetermined number of articles from all of said raceways substantially simultaneously, a funnel arranged to receive the discharge from a group of said raceways, and the lower stop pins for alternate raceways of said group being arranged to project above said floor level at a lesser elevation in their raised positions than the remaining lower stop pins of said group of raceways.

15. An article handling machine comprising an inclined floor, a series of parallel raceway-forming bars arranged in pairs along said floor to form inclined raceways therebetween for rows of movable articles, a pair of parallel transverse adjusting bars secured to one of the raceway-forming bars of each pair, a second pair of parallel transverse adjusting bars secured to the other raceway-forming bar of each pair, and means for transversely moving said adjusting bars in opposite directions to vary the width of said raceways comprising meshed internally threaded gears on threaded end portions of each pair of said adjusting bars, and means for rotating said gears to effect endwise movement of said adjusting bars.

16. An article handling machine comprising an inclined floor, a series of parallel raceway-forming bars arranged in pairs along said floor to form inclined raceways therebetween for rows of movable articles, a pair of parallel transverse adjusting bars of each pair, a second pair of parallel transverse adjusting bars secured to the other raceway-forming bar of each pair, means for transversely moving said adjusting bars in opposite directions to vary the width of said raceways comprising meshed internally threaded gears on threaded end portions of each pair of said adjusting bars, and means for rotating said gears to effect endwise movement of said adjusting bars, and cooperating width gauge parts on the threaded ends of a pair of adjusting bars arranged to hold a sample article.

17. An article handling machine comprising an inclined floor, a series of parallel raceway-forming bars arranged in pairs along said floor to form inclined raceways therebetween for rows of movable articles, and pairs of hinged plates hingedly connected to the upper end portions of the adjacent raceway bars of adjacent raceways and arranged in peaked formations to facilitate the positioning of articles in the adjacent raceways.

18. An article handling machine comprising an inclined floor, a series of parallel raceway-forming bars arranged in pairs along said floor to form inclined raceways therebetween for rows of movable articles, pairs of hinged plates hingedly connected to the upper end portions of the adjacent raceway bars of adjacent raceways and arranged in peaked formations to facilitate the positioning of articles in the adjacent raceways, and means for varying the width of said raceways.

19. An article handling machine comprising an inclined floor, a series of parallel raceway-forming bars arranged in pairs along said floor to form inclined raceways therebetween for rows of movable articles, a pair of parallel transverse adjusting bars secured to one of the raceway-forming bars of each pair, a second pair of parallel transverse adjusting bars secured to the other raceway-forming bar of each pair, pairs of hinged plates hingedly connected to the upper end portions of the adjacent raceway bars of adjacent raceways and arranged in peaked formations to facilitate the positioning of articles in the adjacent raceways, and means for transversely moving said adjusting bars in opposite directions to vary the width of said raceways throughout their length.

20. An article handling machine comprising an inclined floor, a series of parallel raceway-forming bars arranged in pairs along said floor to form inclined raceways therebetween for rows of relatively thin freely movable articles of circular cross-section, means forming an upwardly flared section at the upper ends of said raceways arranged to facilitate the positioning of said articles in an upright rolling edge position, and a kickback extending transversely of the upwardly flared section of said raceways and having radial fingers thereon arranged above and out of alignment with the centerline of corresponding raceways.

21. An article handling machine comprising an inclined floor, a series of parallel raceway-forming bars arranged in pairs along said floor to form inclined raceways therebetween for rows of relatively thin freely movable articles of circular cross-section, means on the upper end portions of the adjacent raceway bars of adjacent raceways arranged in peaked formations to facilitate the positioning of articles in an upright rolling edge position in the adjacent raceways, and a kickback extending transversely of the peaked formation section of said raceways and having radial fingers thereon arranged above and out of alignment with the centerline of corresponding raceways.

22. An article handling machine comprising an inclined floor, a series of parallel raceway-forming bars arranged in pairs along said floor to form inclined raceways therebetween for rows of relatively thin freely movable articles of circular cross-section, pairs of hinged plates hingedly connected to the upper end portions of the adjacent raceway bars of adjacent raceways and arranged in peaked formations to facilitate the positioning of articles in an upright rolling edge position in the adjacent raceways, means for transversely moving said raceway bars of each pair in opposite directions to vary the width of said raceways throughout their length, and a kickback extending transversely of the peaked formation section of said raceways and having radial fingers thereon arranged above and out of alignment with the centerline of corresponding raceways.

23. An article handling machine comprising an inclined floor, means on said floor arranged to form inclined raceways for rows of relatively thin freely movable articles of circular cross-section, means along the upper end portions of said raceways arranged to form upwardly flared extensions thereof to facilitate the positioning of articles in an upright rolling edge position in the adjacent raceways, and a kickback comprising a shaft extending transversely of the flared section of said raceways and having radial fingers carried thereon extending into said flared sections and out of vertical alignment with the centerline of corresponding raceways, said radial fingers being formed of coil spring-reinforced rubber tubing.

24. An article handling machine comprising an inclined floor, a series of parallel raceway-forming bars arranged in pairs along said floor to form inclined raceways therebetween for rows of relatively thin freely movable articles of circular cross-section, means on the upper end portions of the adjacent raceway bars of adjacent raceways and arranged in peaked formations to facilitate the positioning of articles in an upright rolling edge position in the adjacent raceways, and a kickback comprising a shaft extending transversely of the peaked formation section of said raceways and having radial fingers carried thereon extending between said peaked formations and out of vertical alignment with the centerline of corresponding raceways, and a rotary brush at each end of said kickback shaft positioned adjacent the corresponding outermost raceway.

25. An article handling machine comprising a series of parallel inclined raceways for rows of movable articles, means for periodically segregating and subsequently discharging a predetermined number of said articles from all of said raceways comprising operating shafts at opposite sides of said machine, a kickback for controlling the arrangement of articles entering said raceways comprising a shaft extending transversely of said raceways, and means for simultaneously driving said operating and kickback shafts.

26. An article handling machine comprising a series of parallel inclined raceways for rows of movable articles, means for periodically segregating and subsequently discharging a predetermined number of said articles from all of said raceways comprising operating shafts at opposite sides of said machine, a kickback for controlling the arrangement of articles entering said raceways comprising a shaft extending transversely of said raceways, and means for driving said operating and kickback shafts including a spring coupling arranged to permit manual rotation of said kickback shaft.

27. An article handling machine comprising an inclined floor, means arranged to form an inclined raceway on said floor, means for supplying a row of articles to said raceway, upper and lower floor openings spaced longitudinally in said raceway, upper and lower stop pins arranged for reciprocation in said upper and lower floor openings respectively between different elevations relative to said floor, means for alternately raising and lowering said upper and lower stop pins to periodically segregate and discharge a predetermined number of articles from said raceway, and control means for automatically stopping said stop pin raising and lowering means after a predetermined number of operating cycles comprising a series of rotary members having different rates of rotation relative to the operating cycle of said stop pin raising and lowering means, a switch actuating member on each of said rotary members, and a switch member movable into the path of movement of each of said switch actuating members.

28. An article handling machine comprising an inclined floor, means arranged to form an inclined raceway on said floor, means for supplying a row of articles to said raceway, upper and lower transverse floor openings spaced longitudinally in said raceway, upper and lower stop pins arranged for reciprocation in said upper and lower floor openings respectively normal to the angle of inclination of said raceways between elevations above and below said floor, means for alternately raising and lowering said upper and lower stop pins to periodically segregate and discharge a predetermined number of articles from said raceway, and control means for automatically stopping and said stop pin raising and lowering means after a predetermined number of operating cycles comprising a gear arranged to complete one rotation for each operating cycle, a series of driven gears engaging and having predetermined whole number tooth ratios to said first named gear, a switch actuating member adjacent the periphery of each of said driven gears, and a manually movable switch member movable into the path of movement of any one of said switch actuating members.

GEORGE H. DANIELS.

References Cited in the file of this patent

UNITED STATES PATENTS

| Number | Name | Date |
|---|---|---|
| 369,159 | Burns | Aug. 30, 1887 |
| 434,011 | Wrigley | Aug. 12, 1890 |
| 489,140 | Bernstrom | Jan. 3, 1893 |
| 812,221 | Magnan | Feb. 13, 1906 |
| 1,395,727 | Odermatt | Nov. 1, 1921 |
| 1,567,725 | Freese | Dec. 29, 1925 |
| 1,647,356 | Hendry | Nov. 1, 1927 |
| 1,684,600 | Schaf | Sept. 18, 1928 |
| 1,697,220 | Anstiss | Jan. 1, 1929 |
| 1,846,313 | Constable | Feb. 23, 1932 |
| 2,269,937 | Hart | Jan. 13, 1942 |
| 2,509,069 | Mrachek | May 23, 1950 |

FOREIGN PATENTS

| Number | Country | Date |
|---|---|---|
| 662,565 | France | Apr. 8, 1929 |